UNITED STATES PATENT OFFICE.

JOHN MARTIN SCHWANER, OF BROOKLYN, NEW YORK.

CLEANSING AND POLISHING PASTE.

1,382,019.  Specification of Letters Patent.  Patented June 21, 1921.

No Drawing.  Application filed June 14, 1919.  Serial No. 304,303.

*To all whom it may concern:*

Be it known that I, JOHN M. SCHWANER, a citizen of the United States, and resident of the borough of Brooklyn, county of Kings, city and State of New York, have invented certain new and useful Improvements in Cleansing and Polishing Paste, of which the following is a specification.

The object of this invention is to provide a cleansing paste or compound to be used primarily in the cleansing of windows, mirrors and other glasses, and more particularly to expedite this work and to perform this work or duty in a single operation.

The compound should preferably be formed as a paste and the ingredients are such that a paste formed from them will not possess siccative qualities that will make it difficult of operation or of removal after it has been applied.

The compound which I am about to describe can also be employed for the purpose of cleansing metals, particularly brass and when used with soap and water will serve efficiently as a hand paste for badly soiled hands.

The nature of the ingredients used in my cleansing paste are such that whereas combined they serve as very efficient cleansers they are not to be considered as abrasives as they do not scratch the surface to which they are applied, but will quickly remove all dirt or oxidization and with only the rubbing necessary for a thorough application.

The formula which follows gives the approximate portions of the materials used on the basis of 100 pounds of paste plus 5 ounces of extracts or oils added for the purpose of neutralizing the odor or for supplying a more agreeable odor than would result from the mixture of the ingredients and the addition of the essential oils.

The formula.

| | | |
|---|---|---|
| Powdered whiting | 58 | pounds. |
| Powdered pumice stone | 16 | lbs. |
| Kerosene oil | 19 | pounds. |
| Powdered sal-soda | 3 | pounds. |
| Salt (so-called table salt) | 3 | pounds. |
| Oil of citronella | 2½ | oz. |
| Oil of geranium | 2½ | oz. |

In forming the paste the powders, that is the whiting, pumice stone, sal-soda and salt are sifted together and thoroughly mixed and thereafter the oil of citronella and oil of geranium are added to the kerosene and the mixture thoroughly agitated. The mixed oils are next added to the powders and worked therein until a putty-like mass is formed. The quantities here given should produce when well mixed, a mass of about the consistency of putty, but without its siccative qualities. Now the paste is ready for use.

After the paste has been formed in the manner set forth, a small quantity may be applied to a rag or cloth and rubbed thoroughly upon the surface to be cleaned. The rubbing is not intended to apply the paste to the surface, but rather to cause the paste to remove the dirt or tarnish while the paste remains upon the cloth, thus it will be seen that the cleansing of surfaces by the use of this paste is accomplished in one operation, as a second application of the paste is not necessary and the paste itself will not adhere to the surface.

Although I am aware that modifications may be made in the proportions of the ingredients, I prefer the whole as described and set forth.

Having carefully and fully described my invention what I claim and desire to secure by Letters Patent is:—

1. A polishing and cleansing paste comprising whiting, powdered pumice, kerosene oil, sal-soda, salt and essential oils.

2. A cleansing and polishing paste comprising whiting 58%, powdered pumice 16%, kerosene 19% by weight, powdered sal-soda 4%, salt 3% added to which is citronella and rose geranium.

Signed at the city of New York, county and State of New York.

JOHN MARTIN SCHWANER.